US009577562B2

(12) United States Patent
Conrad et al.

(10) Patent No.: US 9,577,562 B2
(45) Date of Patent: Feb. 21, 2017

(54) METHOD AND APPARATUS FOR BACK ELECTROMOTIVE FORCE (EMF) POSITION SENSING IN A CRYOCOOLER OR OTHER SYSTEM HAVING ELECTROMAGNETIC ACTUATORS

(71) Applicant: Raytheon Company, Waltham, MA (US)

(72) Inventors: Theodore J. Conrad, Redondo Beach, CA (US); Dawson R. Bruckman, Hawthorne, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/562,591

(22) Filed: Dec. 5, 2014

(65) Prior Publication Data

US 2016/0164446 A1    Jun. 9, 2016

(51) Int. Cl.
*H02P 1/00* (2006.01)
*H02P 3/00* (2006.01)
(Continued)

(52) U.S. Cl.
CPC ........... *H02P 25/028* (2013.01); *F04B 35/045* (2013.01); *H01F 7/06* (2013.01); *H02P 6/006* (2013.01);
(Continued)

(58) Field of Classification Search
CPC ............ F04B 35/045; F04B 2201/0209; F04B 2201/0206; F04B 2203/0401; F04B 2203/0402; F04B 17/04; F04B 2201/0201; F04B 2203/0404; F04B 39/0044; F04B 39/0088; F04B 49/06; F04B 49/065; F04B 53/003
(Continued)

(56) References Cited

U.S. PATENT DOCUMENTS 4,145,725 A * 3/1979 Wallis ................. G11B 5/5521
310/36
4,797,749 A    1/1989 Paulsen
(Continued)

FOREIGN PATENT DOCUMENTS

WO    WO 2011/022769    3/2011
WO    WO 2013/126719    8/2013

OTHER PUBLICATIONS

International Search Report and Written Opinion issued for PCT/US2015/054039 dated Jan. 20, 2016, 13 pgs.
(Continued)

*Primary Examiner* — Paul Ip

(57) ABSTRACT

A method includes driving a component in an electromagnetic actuator back and forth during one or more cycles of the actuator, where the actuator includes a voice coil. The method also includes identifying a back electromotive force (EMF) voltage of the voice coil during at least one of the one or more cycles. The method further includes determining whether a stroke of the component is substantially centered using the back EMF voltage of the voice coil. In addition, the method includes, based on the determination, adjusting one or more drive signals for the voice coil during one or more additional cycles of the actuator. Determining whether the stroke of the component is centered could include determining whether the back EMF voltage of the voice coil is substantially maximized or determining whether times between extremes in the back EMF voltage are substantially equal.

20 Claims, 7 Drawing Sheets

(51) Int. Cl.
    *H02P 25/02*     (2016.01)
    *F04B 35/04*     (2006.01)
    *H01F 7/06*     (2006.01)
    *H02P 6/00*     (2016.01)
    *H02P 6/18*     (2016.01)
    *H02P 25/06*     (2016.01)

(52) U.S. Cl.
    CPC ............ *H02P 6/182* (2013.01); *H02P 25/027* (2013.01); *H02P 25/034* (2016.02); *H02P 25/06* (2013.01)

(58) Field of Classification Search
    USPC ............ 318/128, 135, 400.22; 310/12.19, 14
    See application file for complete search history.

(56) References Cited

U.S. PATENT DOCUMENTS

| | | | | |
|---|---|---|---|---|
| 5,018,357 | A * | 5/1991 | Livingstone | F25B 9/14 60/520 |
| 5,023,531 | A * | 6/1991 | Altemose | F25B 49/025 318/400.22 |
| 5,342,176 | A * | 8/1994 | Redlich | F04B 35/045 318/687 |
| 5,783,915 | A * | 7/1998 | Shida | H02K 41/0356 310/12.19 |
| 5,978,600 | A * | 11/1999 | Takeuchi | G02B 27/646 396/53 |
| 6,098,409 | A * | 8/2000 | Chase | G05D 23/1906 62/6 |
| 6,256,999 | B1 * | 7/2001 | Chase | G05D 23/1906 62/6 |
| 6,289,680 | B1 * | 9/2001 | Oh | F04B 49/065 417/45 |
| 6,446,444 | B1 * | 9/2002 | Chase | F02G 1/043 60/520 |
| 6,611,118 | B2 * | 8/2003 | Abe | G11B 21/02 318/135 |
| 6,762,745 | B1 | 7/2004 | Braun et al. | |
| 6,809,486 | B2 * | 10/2004 | Qiu | F04B 17/04 318/128 |
| 6,933,629 | B2 * | 8/2005 | Qiu | F16F 7/1011 310/14 |
| 7,113,351 | B2 * | 9/2006 | Hovanky | G03B 3/10 359/696 |
| 7,184,254 | B2 * | 2/2007 | Dimanstein | F04B 35/045 318/687 |
| 8,201,467 | B2 * | 6/2012 | Johnson | F16H 25/20 310/80 |
| 8,231,355 | B2 * | 7/2012 | Tian | F04B 35/045 318/135 |
| 8,981,682 | B2 * | 3/2015 | Delson | A63F 13/06 318/114 |
| 2003/0218854 | A1 * | 11/2003 | Dimanstein | F04B 35/045 361/187 |
| 2003/0234629 | A1 * | 12/2003 | Trifilo | H02P 6/182 318/459 |
| 2004/0027088 | A1 * | 2/2004 | Abe | G11B 21/02 318/650 |
| 2004/0174614 | A1 * | 9/2004 | Hovanky | G03B 3/10 359/694 |
| 2004/0232868 | A1 * | 11/2004 | Sawtell | G11B 5/5526 318/569 |
| 2004/0234394 | A1 * | 11/2004 | Duncan | F04B 35/045 417/415 |
| 2004/0263005 | A1 * | 12/2004 | McGill | F04B 35/045 310/14 |
| 2005/0082994 | A1 * | 4/2005 | Qiu | F16F 7/1011 318/128 |
| 2005/0168179 | A1 * | 8/2005 | McGill | F04B 35/045 318/119 |
| 2006/0070518 | A1 * | 4/2006 | McGill | F04B 35/045 91/359 |
| 2006/0104451 | A1 | 5/2006 | Browning et al. | |
| 2006/0187572 | A1 * | 8/2006 | Tan | G11B 21/12 360/78.07 |
| 2006/0290662 | A1 * | 12/2006 | Houston | A63F 13/06 345/156 |
| 2007/0029956 | A1 * | 2/2007 | Hofer | H02P 6/185 318/276 |
| 2007/0095073 | A1 * | 5/2007 | Tian | F04B 35/045 62/6 |
| 2007/0152512 | A1 * | 7/2007 | Tian | H02P 25/06 310/12.04 |
| 2007/0164694 | A1 * | 7/2007 | Boscolo Berto | G11B 19/28 318/400.34 |
| 2008/0218823 | A1 * | 9/2008 | Mizoguchi | H02K 33/16 359/198.1 |
| 2009/0015186 | A1 | 1/2009 | Boling et al. | |
| 2010/0072842 | A1 * | 3/2010 | Johnson | F16H 25/20 310/80 |
| 2010/0125167 | A1 | 5/2010 | Sugimoto | |
| 2011/0248817 | A1 * | 10/2011 | Houston | A63F 13/06 340/4.2 |
| 2012/0098469 | A1 * | 4/2012 | Takeuchi | H02K 41/031 318/135 |
| 2012/0232780 | A1 * | 9/2012 | Delson | A63F 13/06 701/400 |
| 2013/0016413 | A1 | 1/2013 | Saeedi et al. | |
| 2013/0088176 | A1 * | 4/2013 | Kwon | H02K 7/14 318/3 |
| 2013/0154539 | A1 | 6/2013 | Grossmann et al. | |
| 2013/0169857 | A1 * | 7/2013 | Christo | H04N 5/23212 348/349 |

OTHER PUBLICATIONS

International Search Report and Written Opinion issued for PCT/US2015/020756 dated Aug. 13, 2015, 9 pgs.

Lawrence E. Savage, II, et al., "Linear Actuator Force Matching Using Back EMF", U.S. Appl. No. 14/280,074 dated May 16, 2014, 21 pgs.

"Counter-electromotive force";Wikipedia-the free encylopedia;http://en.wikipedia.org/w/index.php?title=Counter-electromotive_force&oldid=613561002; Printed Dec. 5, 2014; 2 pages.

U.S. Appl. No. 14/280,074 entitled "Linear Actuator Force Matching Using Back EMF" filed on May 16, 2014; 21 pages.

* cited by examiner

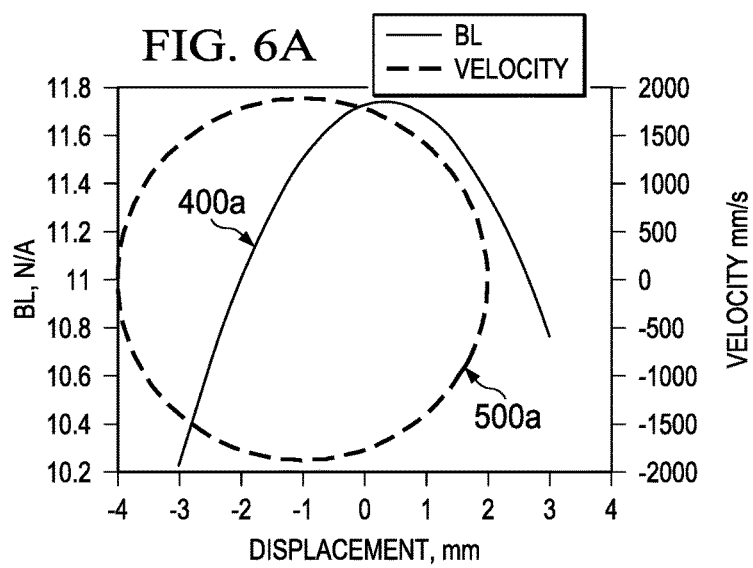
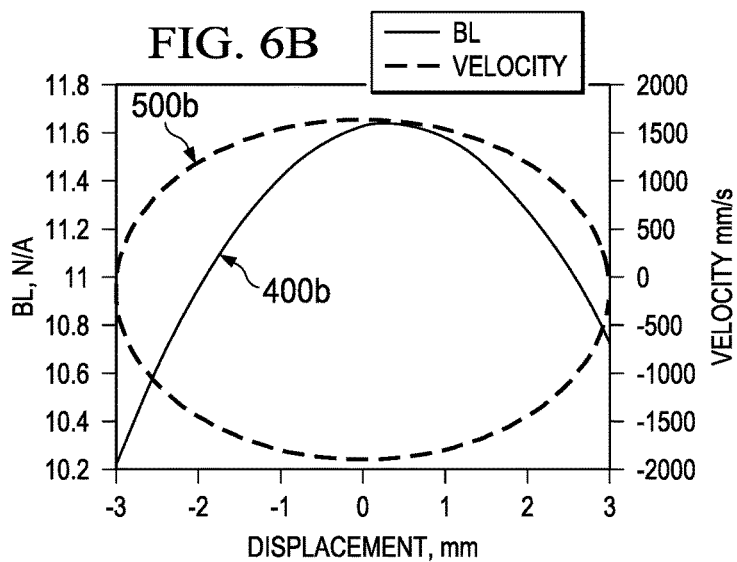
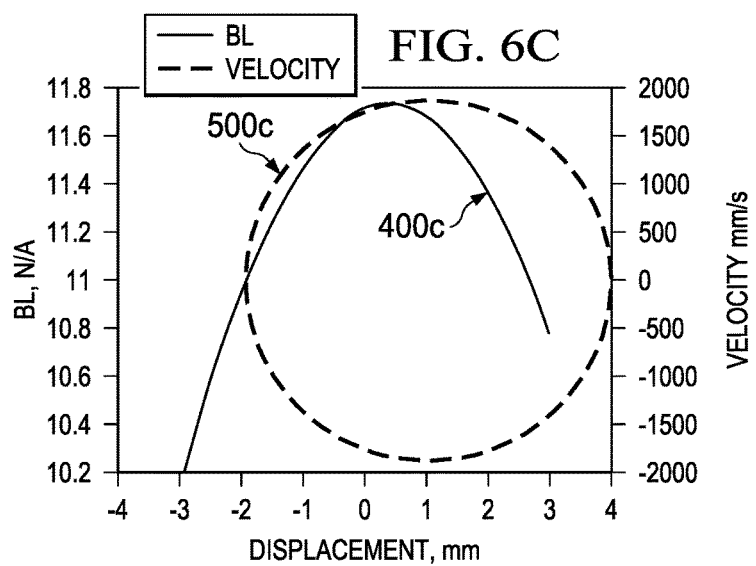

METHOD AND APPARATUS FOR BACK ELECTROMOTIVE FORCE (EMF) POSITION SENSING IN A CRYOCOOLER OR OTHER SYSTEM HAVING ELECTROMAGNETIC ACTUATORS

TECHNICAL FIELD

This disclosure is generally directed to electromagnetic actuators. More specifically, this disclosure is directed to a method and apparatus for back electromotive force (EMF) position sensing in a cryocooler or other system having electromagnetic actuators.

BACKGROUND

Cryocoolers are often used to cool various components to extremely low temperatures. For example, cryocoolers can be used to cool focal plane arrays in different space and airborne imaging systems. There are various types of cryocoolers having differing designs, such as pulse tube cryocoolers and Stirling cryocoolers.

Some cryocoolers include position sensors that detect the positions of moving components within the cryocoolers. Position sensing can allow various functions to be performed in the cryocoolers, such as precision motor control, cryocooler health monitoring, and active vibration cancellation. One conventional approach for position sensing in cryocoolers involves the use of linear variable differential transformers (LVDTs). However, position sensors that use LVDTs are often costly and occupy a large amount of space. Also, the packaging requirements for position sensors that use LVDTs can limit the available mechanical design space in undesirable ways. In addition, position sensors that use LVDTs may require that additional circuitry to be added to conventional cryocooler electronics.

SUMMARY

This disclosure provides a method and apparatus for back electromotive force (EMF) position sensing in a cryocooler or other system having electromagnetic actuators.

In a first embodiment, a method includes driving a component in an electromagnetic actuator back and forth during one or more cycles of the actuator, where the actuator includes a voice coil. The method also includes identifying a back EMF voltage of the voice coil during at least one of the one or more cycles. The method further includes determining whether a stroke of the component is substantially centered using the back EMF voltage of the voice coil. In addition, the method includes, based on the determination, adjusting one or more drive signals for the voice coil during one or more additional cycles of the actuator.

In a second embodiment, an apparatus includes a controller configured to generate one or more drive signals for driving a component of an electromagnetic actuator back and forth during one or more cycles of the actuator. The controller is also configured to identify a back EMF voltage of a voice coil in the actuator during at least one of the one or more cycles. The controller is further configured to determine whether a stroke of the component is substantially centered using the back EMF voltage of the voice coil and, based on the determination, adjust the one or more drive signals during one or more additional cycles of the actuator.

In a third embodiment, a system includes an electromagnetic actuator having a voice coil. The system also includes a controller configured to generate one or more drive signals for driving a component of the actuator back and forth during one or more cycles of the actuator. The controller is also configured to identify a back EMF voltage of the voice coil during at least one of the one or more cycles. The controller is further configured to determine whether a stroke of the component is substantially centered using the back EMF voltage of the voice coil and, based on the determination, adjust the one or more drive signals during one or more additional cycles of the actuator.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 6A through 7 illustrate a first example technique for centering a component of an electromagnetic actuator using back EMF position sensing in a cryocooler or other system according to this disclosure.

DETAILED DESCRIPTION

FIGS. 1 through 9, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1A:
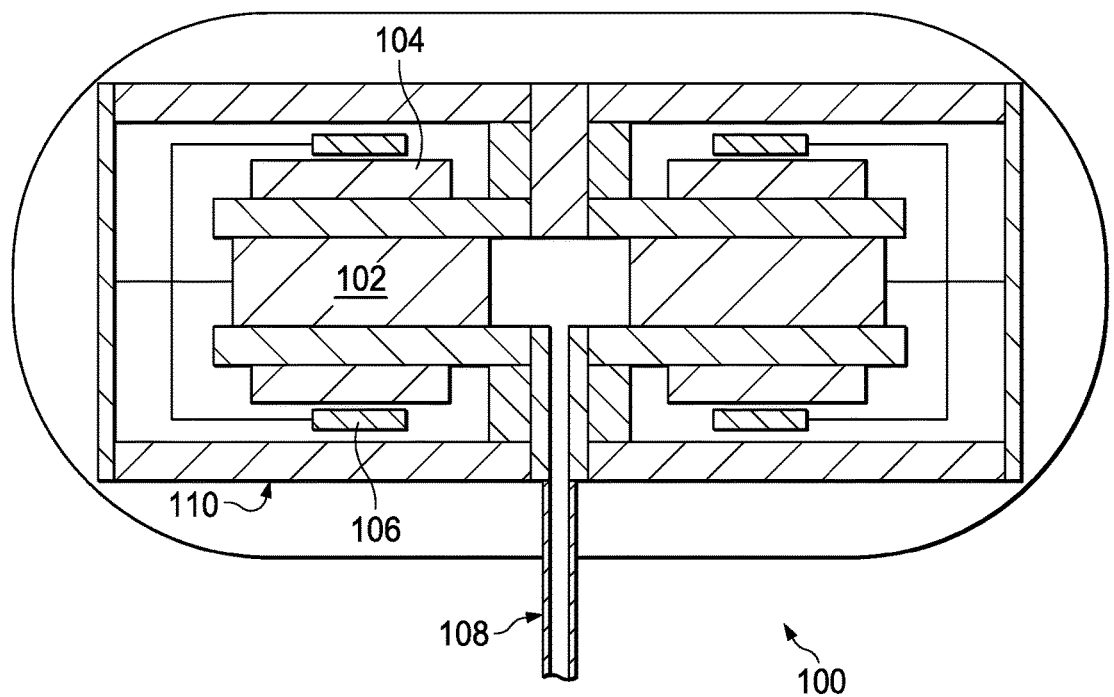
FIGS. 1A and 1B illustrate example cryocooler components that utilize electromagnetic actuators according to this disclosure.
Figure 1B:
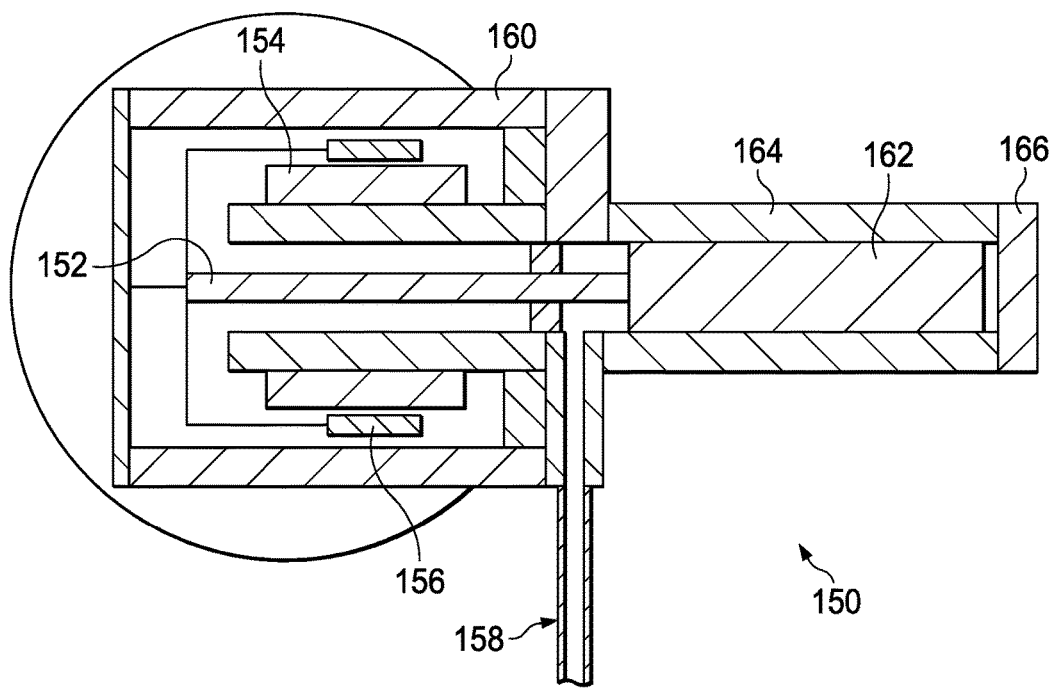

FIGS. 1A and 1B illustrate example cryocooler components that utilize electromagnetic actuators according to this disclosure. In particular, FIG. 1A illustrates an example compressor assembly 100 for a cryocooler, and FIG. 1B illustrates an example expansion assembly 150 for a cryocooler.

A cryocooler generally represents a device that can cool other components to cryogenic temperatures or other extremely low temperatures, such as to about 4 Kelvin, about 10 Kelvin, or about 20 Kelvin. A cryocooler typically operates by creating a flow of fluid (such as liquid or gas) back and forth within the cryocooler. Controlled expansion and contraction of the fluid creates a desired cooling of one or more components.

In FIG. 1A, the components on the left side of FIG. 1A are mirrored on the right side of FIG. 1A. For convenience, only the components on one side of the compressor assembly 100 are identified using reference numbers. As shown in FIG. 1A, the compressor assembly 100 includes an electromagnetic actuator having a piston 102 that moves back and forth based on interactions between magnets 104 and a voice coil 106 (also often referred to as a "motor coil"). In this particular example, the voice coil 106 is physically connected to the piston 102, while the magnets 104 are generally stationary (although the opposite arrangement could also be used).

The piston 102 is moved within the compressor assembly 100 by creating a varying magnetic field using the voice coil 106, which interacts with the magnets 104. By energizing the voice coil 106 appropriately, the varying magnetic field created by the voice coil 106 causes the piston 102 to move or "stroke" back and forth during multiple compression cycles, which causes repeated pressure changes in a fluid that is provided through a transfer line 108.

The compressor assembly 100 is positioned within a housing 110. The housing 110 represents a support structure to or in which the compressor assembly 100 is mounted. The housing 110 includes any suitable structure for encasing or otherwise protecting a cryocooler (or portion thereof).

As shown in FIG. 1B, the expansion assembly 150 includes an electromagnetic actuator having a piston 152 that moves back and forth based on interactions between magnets 154 and a voice coil 156. In this particular example, the voice coil 156 is physically connected to the piston 152, while the magnets 154 are generally stationary (although the opposite arrangement could also be used). The piston 152 is moved within the expansion assembly 150 by creating a varying magnetic field using the voice coil 156, which interacts with the magnets 154. The expansion assembly 150 is positioned within a housing 160, which represents a support structure to or in which the expansion assembly 150 is mounted. The housing 160 includes any suitable structure for encasing or otherwise protecting a cryocooler (or portion thereof).

The piston 152 here is coupled to a Stirling displacer 162, which moves within a regenerator 164. The expansion assembly 150 operates to expand compressed gas received from a compressor via a transfer line 158. By operating in this manner, a cold end 166 of the structure is cooled to cryogenic or other extremely low temperatures.

In a compressor assembly, expansion assembly, or other component that uses at least one electromagnetic actuator in a cryocooler (such as a balancer assembly) or other system, it is often necessary or desirable to know if the stroke of the actuator is centered. For example, there are often hard stops located on opposite sides of a piston, where the hard stops prevent movement of the piston beyond the hard stops. To prevent damage to the piston, the piston is ideally driven while it is centered so that it is able to move back and forth without actually contacting the hard stops. Centering could take any suitable form, such as when the stroke of the piston is centered at a particular location. The particular location could be located exactly between the hard stops or exactly between the magnetic poles of the magnets.

As described in more detail below, the back electromotive force (EMF) of a voice coil of an electromagnetic actuator is used to help center a component of the actuator. Effectively, the voice coil is used as a sensor to help detect the relative position of a piston or other component with respect to a desired center position. This approach can help to reduce the cost, size, mass, and complexity of a cryocooler or other system because the use of auxiliary position sensors can be reduced or eliminated. Moreover, this approach can be used to drive the actuator more effectively. For instance, the piston can be precisely centered and then driven fully without physically contacting its hard stops, which can help to reduce physical damage to the piston. Additional details regarding the use of back EMF in a voice coil for position sensing in an electromagnetic actuator are provided below.

Although FIGS. 1A and 1B illustrate examples of cryocooler components that utilize electromagnetic actuators, various changes may be made to FIGS. 1A and 1B. For example, the specific implementations of the compressor and expansion assemblies shown here are for illustration only. Also, the techniques described below could be used with other components of a cryocooler that use electromagnetic actuators containing voice coils or with components of non-cryocooler-based systems that use electromagnetic actuators containing voice coils.

Figure 2:
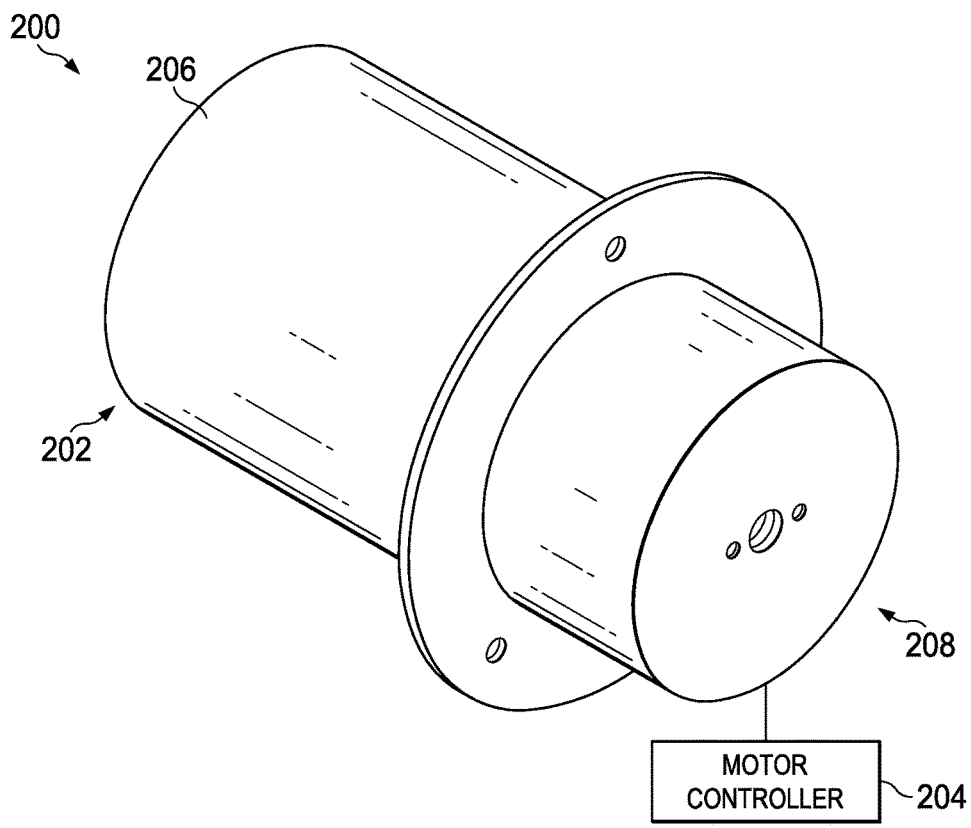
FIG. 2 illustrates an example electromagnetic actuator in a cryocooler or other system according to this disclosure.

FIG. 2 illustrates an example electromagnetic actuator 200 in a cryocooler or other system according to this disclosure. The electromagnetic actuator 200 could, for example, be used in the cryocooler compressor assembly 100 of FIG. 1A, the cryocooler expansion assembly 150 of FIG. 1B, or other suitable component.

As shown in FIG. 2, the electromagnetic actuator 200 includes a linear motor 202 and a motor controller 204. The linear motor 202 includes a housing 206 and a piston 208. The housing 206 can include at least one magnet or magnetized portion, and the piston 208 can include at least one voice coil that is energized to move the piston 208 back and forth within the housing 206. As noted above, however, the opposite arrangement is also possible.

The motor controller 204 provides electrical signals that energize the coil(s) of the linear motor 202. The motor controller 204 can also implement one or more techniques described below for using the back EMF of a voice coil to sense the relative position of the piston 208 and determine whether the piston 208 is centered. Note that the position of a piston could be expressed in any suitable form. For instance, in some embodiments, the actual centering of the piston's stroke could be expressed as a relative offset (plus or minus) from a desired centered position.

The motor controller 204 could use any suitable technique to measure the back EMF of a coil in order to sense the position of a piston. For example, the motor controller 204 could measure the current supplied to a voice coil and the voltage across the voice coil over time. In general, the total voltage $E_t$ on a coil can be expressed as:

$$\epsilon_t = \epsilon_R + \epsilon_L + \epsilon_b \quad (1)$$

$$= IR + j\omega LI + \alpha v \quad (2)$$

where $\epsilon_R$ denotes the resistive voltage, $\epsilon_L$ denotes the inductive voltage, and $\epsilon_b$ denotes the back EMF voltage on the coil. The resistive and inductive voltages are based on the current through the coil. The back EMF voltage is proportional to the velocity of the piston and can be expressed as:

$$\epsilon_b = v \times Bl \quad (3)$$

where v denotes the velocity, B denotes the magnetic flux inside the coil, and l denotes the length of the coil.

Once the back EMF of the piston's voice coil is identified, the position of the piston can be determined. The motor controller 204 (or another component that operates using data collected by the motor controller 204 or other devices) can determine the relative position of a piston using the back EMF of the piston's voice coil as described below.

Although FIG. 2 illustrates one example of an electromagnetic actuator 200 in a cryocooler or other system, various changes may be made to FIG. 2. For example, the electromagnetic actuator 200 could include a linear motor 202 having any other suitable form.

Figure 3:
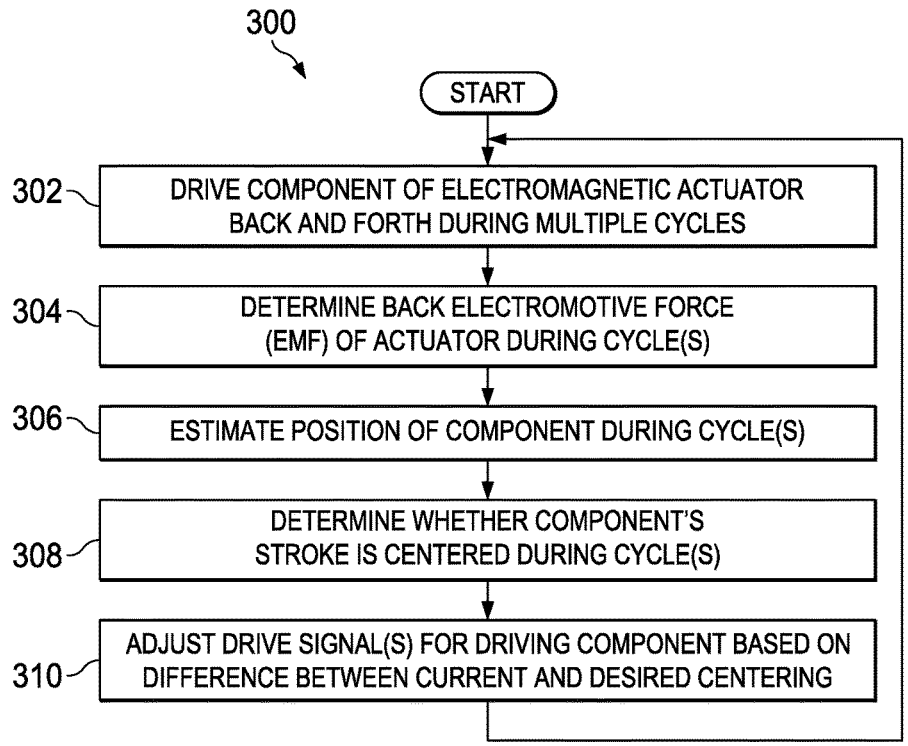
FIG. 3 illustrates an example method for back electromotive force (EMF) position sensing in a cryocooler or other system according to this disclosure.

FIG. 3 illustrates an example method 300 for back EMF position sensing in a cryocooler or other system according to this disclosure. For ease of explanation, the method 300 is described as being used by the motor controller 204 with the linear motor 202 operating in a cryocooler, such as in the compressor assembly 100 or the expansion assembly 150. However, the method 300 could be used by any other suitable device and in any other suitable system, and the method 300 could be used with any other suitable electromagnetic actuator containing a voice coil.

As shown in FIG. 3, a component of an electromagnetic actuator is driven back and forth during multiple cycles at step 302. This could include, for example, energizing at least one coil 106, 156 on the piston 102, 152, 208 in order to create a magnetic field that interacts with at least one magnet 104, 154 on a housing 206 of the piston. As a particular example, this could include the motor controller 204 generating pulse width modulation (PWM) or other electrical signals for the coil(s) 106, 156 of the piston 208. The piston 208 could be driven back and forth for any suitable purpose, such as compression or expansion in a cryocooler.

The back EMF of the actuator is determined during one or more of the cycles at step 304. This could include, for example, the motor controller 204 calculating the back EMF of the coil 106, 156 in the motor 202 based on voltage and current measurements. The back EMF of the coil 106, 156 could be calculated over a single back-and-forth cycle of the piston or over multiple consecutive or non-consecutive back-and-forth cycles of the piston.

The position of the actuator component is estimated over the course of the one or more cycles at step 306, and a determination is made whether the component's stroke is centered at step 308. This could include, for example, the motor controller 204 using variations in the back EMF voltage of the coil 106, 156 to identify whether the coil 106, 156 is centered at a desired location. Two example techniques for sensing the position of an actuator component and centering the actuator component are provided below.

If necessary, one or more drive signals for driving the actuator component are adjusted at step 310. This could include, for example, the motor controller 204 identifying which drive signal or signals maximize the back EMF and then using the identified drive signal(s). This could also include the motor controller 204 identifying how off-center the piston 208 is and in what direction and modifying the drive signal(s) accordingly. Once the piston 208 is centered, the back EMF may or may not be used further. For instance, in some embodiments, the back EMF of the coil 106, 156 can be used to determine the stroke amplitude of the piston 208, meaning how far the piston 208 travels during each cycle.

Although FIG. 3 illustrates one example of a method 300 for back EMF position sensing in a cryocooler or other system, various changes may be made to FIG. 3. For example, while shown as a series of steps, various steps in each figure could overlap, occur in parallel, or occur any number of times.

Figure 4:
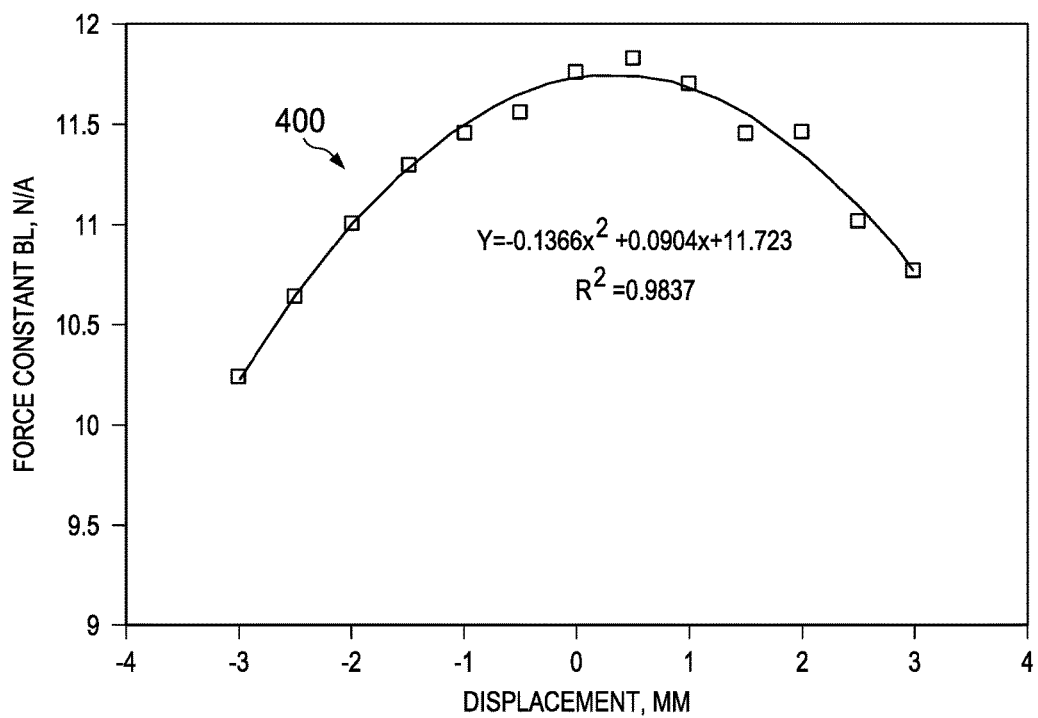
FIGS. 4 and 5 illustrate example diagrams associated with operation of an electromagnetic actuator in a cryocooler or other system according to this disclosure.
Figure 5:
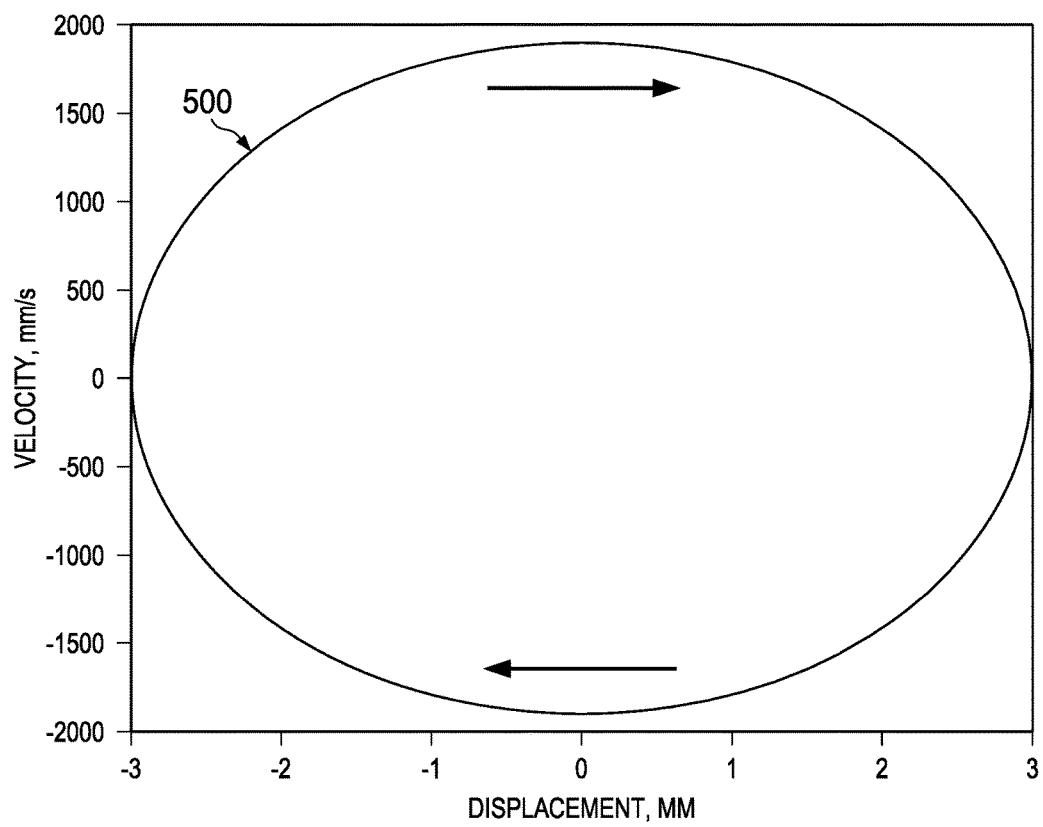

FIGS. 4 and 5 illustrate example diagrams associated with operation of an electromagnetic actuator in a cryocooler or other system according to this disclosure. While described below as being associated with a piston in a motor, similar diagrams could be obtained for other components of an electromagnetic actuator. FIG. 4 shows an example plot 400 illustrating the force constant associated with a motor. The force constant represents the product of the magnetic flux perpendicular to a voice coil with the length of a wire in the voice coil. It denotes the amount of force generated per ampere of current, and it also represents the proportionality constant between piston velocity and measured back EMF. FIG. 5 shows an example plot 500 illustrating the velocity of a piston as a function of displacement of the piston's voice coil from a reference point. The reference point could represent a known or desired centered position of the piston within a cryocooler or other system.

As shown in the plot 400 of FIG. 4, the maximum force per ampere of current on a piston occurs when the piston's voice coil has a zero or near zero displacement from a reference point. If the reference point denotes the location exactly between the magnetic poles of the magnets, the back EMF is at a maximum here because it represents the point of greatest interaction between the voice coil(s) and magnets. As the piston moves away from this point, interaction between the voice coil(s) and magnets decreases, thereby generating less peak back EMF.

As shown in the plot 500 of FIG. 5, the velocity of the piston varies elliptically with displacement. The piston's motion is sinusoidal (or nearly so), and as a result its velocity has a maximum value at (or very near to) the center of the stroke. At one far end of the piston's path, the velocity decreases before reaching zero momentarily and then reverses sign as the piston reverses direction. At that point, the velocity increases to its maximum before decreasing again as it approaches the other far end of its path.

As shown in Equation (3) above, the force constant (Bl) and measured back EMF can be used to determine velocity (v) and therefore position. With knowledge of the intrinsic shape of a magnetic field in a motor and the behaviors of a piston as shown in FIGS. 4 and 5, it is possible to center the stroke of the piston in the motor. Two example techniques for centering a component of an electromagnetic actuator are described below.

Although FIGS. 4 and 5 illustrate examples of diagrams associated with operation of an electromagnetic actuator in a cryocooler or other system, various changes may be made to FIGS. 4 and 5. For example, the curves shown in FIGS. 4 and 5 are for illustration only and depend on the specific design of the cryocooler or other system being controlled.

Figure 7:
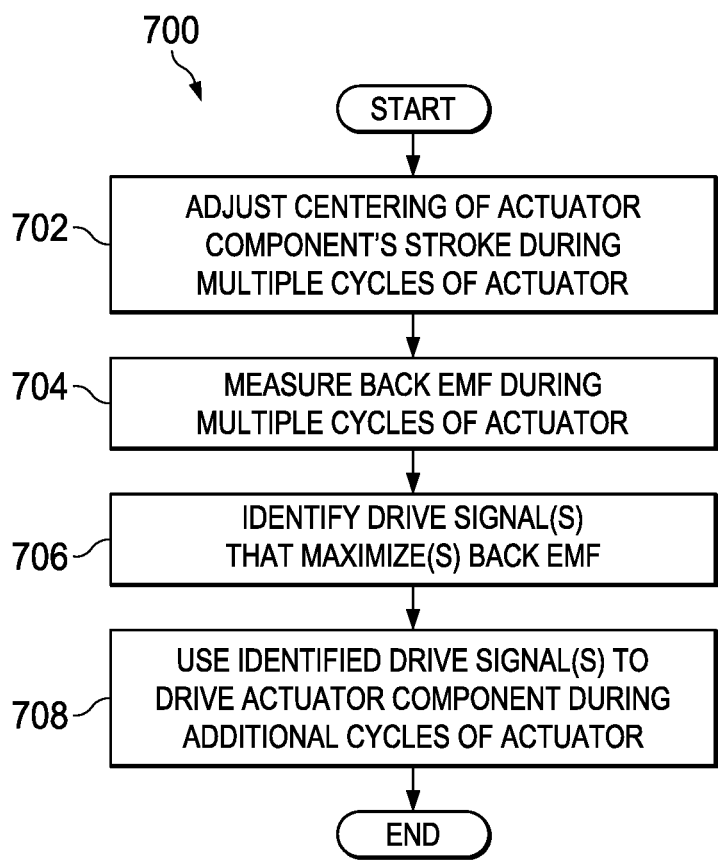

FIGS. 6A through 7 illustrate a first example technique for back EMF position sensing in a cryocooler or other system according to this disclosure. While described below as being used to control a piston in a motor, the same or similar technique could be used to control other components of electromagnetic actuators. FIGS. 6A through 6C contain different plots 400a-400c illustrating the overlap between the peak velocity and the peak proportionality constant with different amounts of offset. In FIG. 6A, a piston's stroke is offset from a reference point by −1 mm. In FIG. 6B, a piston's stroke is centered at a reference point. In FIG. 6C, a piston's stroke is offset from a reference point by +1 mm. FIGS. 6A through 6C also contain different plots 500a-500c illustrating the velocities of a piston as a function of displacement from a reference point, where the piston is centered at different locations.

Since the back EMF voltage of a coil can be calculated as the product of force constant and velocity, the peak of each plot 400, 400a, 400b, 400c ideally falls at the maximum positive value of the corresponding plot 500, 500a, 500b, 500c. It is at this point that the back EMF voltage is maximized. In the examples shown in FIGS. 6A through 6C, this could occur when the piston's stroke is centered at about +0.5 mm with respect to the reference point.

Based on this, a method 700 as shown in FIG. 7 can be used to identify the location where the back EMF is maximized. As shown in FIG. 7, the centering of an actuator component's stroke in an electromagnetic actuator is adjusted during multiple cycles of the actuator at step 702. This could include, for example, the motor controller 204 adjusting the drive signal(s) provided to the coil 106, 156 of the linear motor 202 in order to change the centering of the piston's stroke within the motor 202. The motor controller 204 need not know or be able to calculate the exact distances associated with the changes in centering. Rather, the motor controller 204 could simply vary the drive signals in a manner that is known to alter the centering of the piston's stroke.

The back EMF voltage of the voice coil is measured during the multiple cycles of the actuator at step 704. As noted above, this could be done by measuring the voltage and current across the voice coil 106, 156 of the motor 202. One or more drive signals that maximize the back EMF voltage are identified at step 706, and the identified drive signals are used to drive the actuator component during additional cycles of the actuator at step 708. The drive signals that are identified as maximizing the back EMF could be the drive signals that were actually provided to the motor 202 during one or more cycles or an interpolation or other combination of multiple drive signals that were actually provided to the motor 202 during different cycles. By maximizing the back EMF, the piston's stroke can be substantially centered at an optimal location within the motor 202. In some embodiments, the motor controller 204 could have a sensitivity of about 0.2-0.3V/mm, allowing the piston's stroke to be centered very close to the desired point.

Figure 8A:
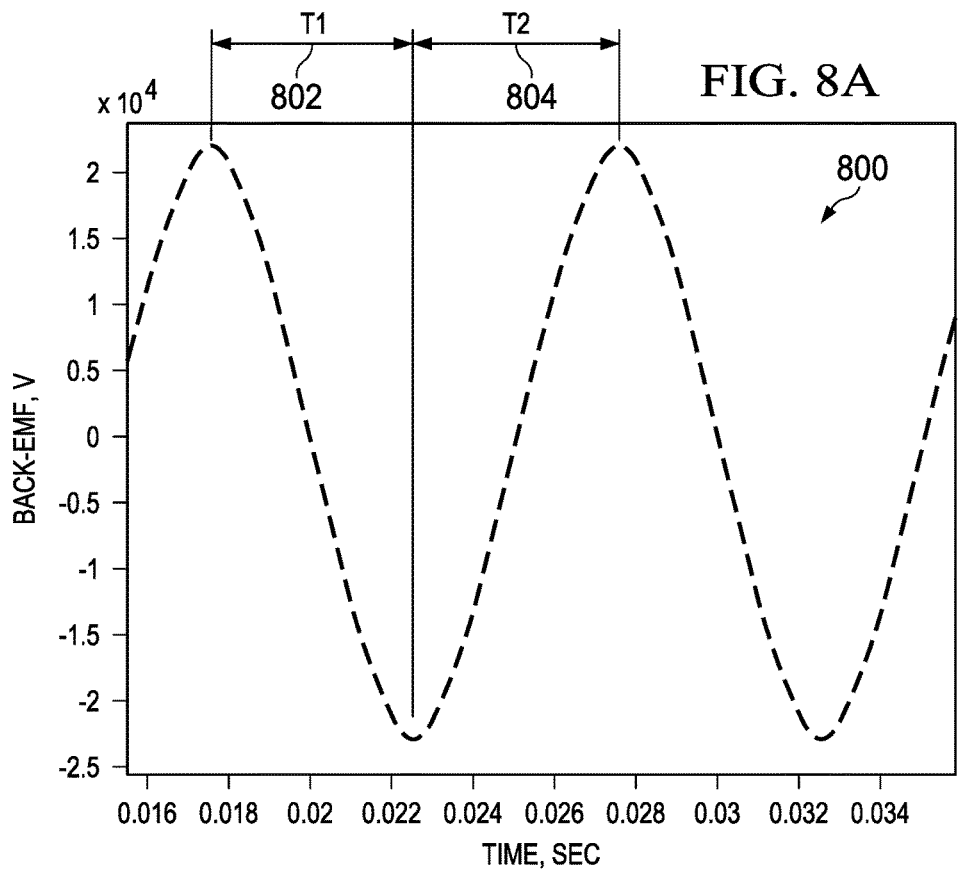
FIGS. 8A through 9 illustrate a second example technique for centering a component of an electromagnetic actuator using back EMF position sensing in a cryocooler or other system according to this disclosure.
Figure 8B:
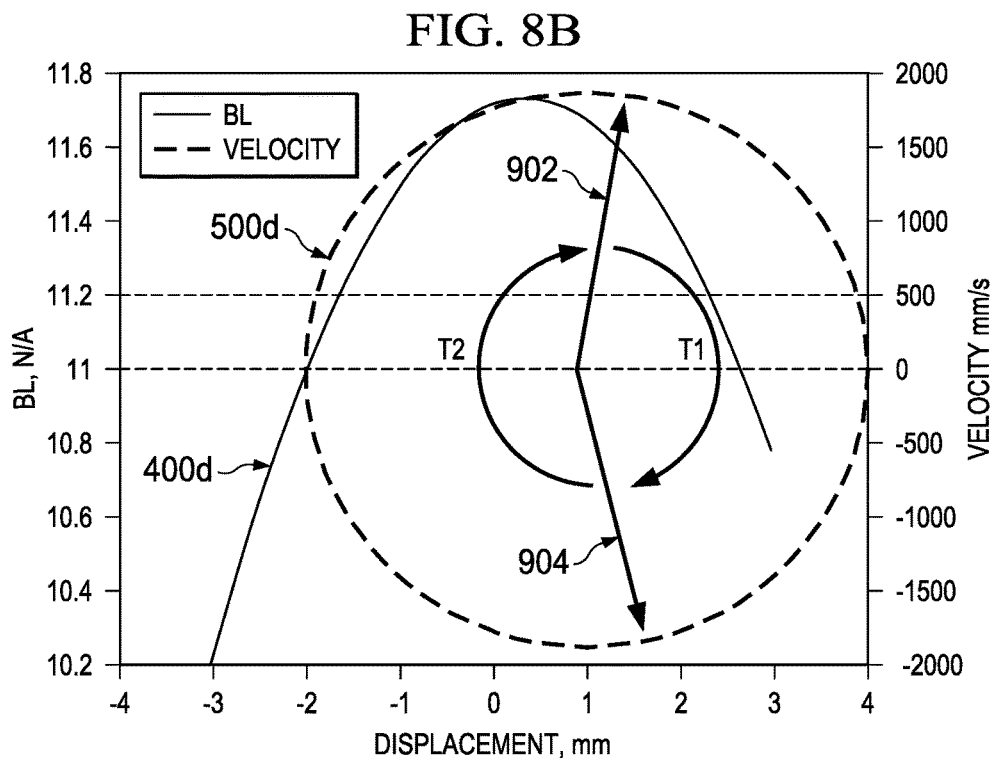
Figure 9:
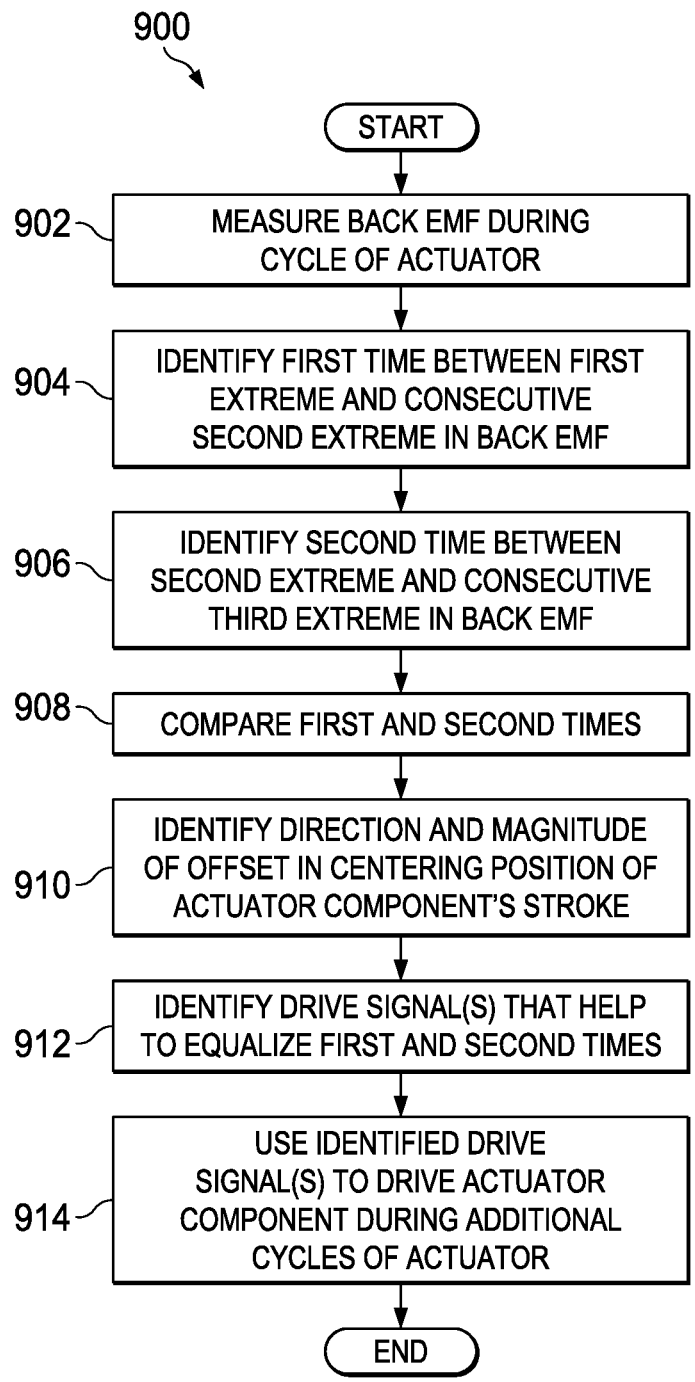

FIGS. 8A through 9 illustrate a second example technique for back EMF position sensing in a cryocooler or other system according to this disclosure. While described below as being used to control a piston in a motor, the same or similar technique could be used to control other components of electromagnetic actuators. FIG. 8A illustrates an example plot 800 showing the back EMF of a voice coil expressed as a function of time. As can be seen here, the back EMF of the voice coil over time is substantially sinusoidal. Within the plot 800 are two times 802-804, which represent the times between two consecutive extreme values (maximum and minimum or minimum and maximum) in the back EMF voltage.

Because of this sinusoidal behavior of the back EMF, the times 802-804 defined in the plot 800 are ideally equal in length when the piston's stroke is centered at an optimal position. An offset of the piston's stroke in one direction would lengthen the time 802 and shorten the time 804, while an offset of the piston's stroke in the other direction would lengthen the time 804 and shorten the time 802. By measuring the times 802-804, it is possible to determine the direction of the piston stroke's offset and optionally its magnitude.

An example of this is shown in FIG. 8B, where a plot 400d illustrates the force constant or back EMF proportionality constant of a piston whose stroke is offset and where a plot 500d illustrates the velocities of the offset piston. Here, two vectors 902-904 denote the locations where the back EMF voltage is maximized and minimized, and the times $T_1$ and $T_2$ here are clearly unequal. Also, it is possible to determine the direction of the offset because the time $T_2$ is larger, and it is possible to determine the magnitude of the offset based on the difference between the times $T_1$ and $T_2$. In contrast, similar vectors if used in FIG. 6B would show times $T_1$ and $T_2$ being much closer in magnitude.

Based on this, a method 900 as shown in FIG. 9 can be used to identify the direction and optionally the magnitude of any offset in an actuator component's stroke. As shown in FIG. 9, the back EMF voltage of a voice coil is measured during one or more cycles of an actuator at step 902. As noted above, this could be done by measuring the voltage and current across the voice coil 106, 156 of the motor 202.

A first time between consecutive extremes in the back EMF voltage is identified at step 904, and a second time between consecutive extremes in the back EMF voltage is identified at step 906. This could include, for example, the motor controller 204 measuring the first time between a first positive peak and the consecutive negative trough in the back EMF voltage. This could also include the motor controller 204 measuring the second time between the same negative trough and a consecutive second positive peak in the back EMF voltage.

The first and second times are compared at step 908, and the direction and optionally the magnitude of any offset in the centering position of the actuator component's stroke are identified at step 910. As noted above, the direction of the offset can be based on which of the first and second times is larger, and the magnitude of the offset can be based on a difference between the first and second times.

One or more drive signals that help to equalize the first and second times are identified at step 912, and the identified drive signals are used to drive the actuator component during additional cycles of the actuator at step 914. Note that the drive signals identified here may or may not immediately equalize the first and second times, just that the drive signals are identified to help reduce any difference between the first and second times. By substantially equalizing the first and second times, the piston's stroke can be substantially centered at an optimal location within the motor 202. In some embodiments of a cryocooler having a 100 Hz operation with a ±3 mm stroke and a sampling rate of 36 kHz, the resolution of the centering using this technique could be about 0.1 mm.

Although FIGS. 6A through 9 illustrate examples of techniques for centering a component of an electromagnetic actuator using back EMF position sensing in a cryocooler or other system, various changes may be made to FIGS. 6A through 9. For example, the plots shown in FIGS. 6A through 6C, 8A, and 8B are for illustration only and depend on the specific design of the cryocooler or other system being controlled. Also, various other techniques could be used to center an actuator component's stroke at a desired location using the back EMF of the actuator component's voice coil.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   driving a component in an electromagnetic actuator back and forth during multiple cycles of the actuator using a motor controller, the actuator comprising a voice coil;
   identifying an extreme of a back electromotive force (EMF) voltage of the voice coil during each of at least some of the cycles using the motor controller;
   determining whether a stroke of the component is substantially centered based on the extremes of the back EMF voltage of the voice coil using the motor controller; and
   based on the determination, adjusting one or more drive signals for the voice coil during one or more additional cycles of the actuator using the motor controller;
   wherein determining whether the stroke of the component is substantially centered comprises determining whether the back EMF voltage of the voice coil is substantially maximized; and
   wherein determining whether the back EMF voltage of the voice coil is substantially maximized comprises:
   identifying the extremes of the back EMF voltage of the voice coil during different cycles of the actuator in which a centered position of the component's stroke is different; and
   identifying a largest extreme of the back EMF voltage.

2. The method of Claim 1, wherein adjusting the one or more drive signals for the voice coil comprises adjusting the one or more drive signals for the voice coil to obtain the largest extreme of the back EMF voltage.

3. The method of claim 1, wherein:
   the electromagnetic actuator comprises a motor; and
   the component comprises a piston.

4. A method comprising:
   driving a component in an electromagnetic actuator back and forth during multiple cycles of the actuator using a motor controller, the actuator comprising a voice coil;
   identifying an extreme of a back electromotive force (EMF) voltage of the voice coil during each of at least some of the cycles using the motor controller;
   determining whether a stroke of the component is substantially centered based on the extremes of the back EMF voltage of the voice coil using the motor controller; and
   based on the determination, adjusting one or more drive signals for the voice coil during one or more additional cycles of the actuator using the motor controller;
   wherein determining whether the stroke of the component is substantially centered comprises:
   Identifying a first time between a first extreme in the back EMF voltage and a second extreme in the back EMF voltage;
   Identifying a second time between the second extreme in the back EMF voltage and a third extreme in the back EMF voltage; and
   determining whether the first and second times are substantially equal.

5. The method of claim 4, wherein adjusting the one or more drive signals for the voice coil comprises:
   adjusting the one or more drive signals for the voice coil to move a centering of the stroke of the component in a first direction when the first time is larger than the second time; and
   adjusting the one or more drive signals for the voice coil to move the centering of the stroke of the component in a second direction when the second time is larger than the first time.

6. The method of claim 5, further comprising:
   using a difference between the first and second times to identify a magnitude of an offset between the centering of the stroke of the component and a desired position.

7. An apparatus comprising:
   a controller configured to generate one or more drive signals for driving a component of an electromagnetic actuator back and forth during multiple cycles of the actuator;
   wherein the controller is configured to:
   identifying an extreme of a back electromotive force (EMF) voltage of a voice coil in the actuator during each of at least some of the cycles;
   determine whether a stroke of the component is substantially centered based on the extremes of the back EMF voltage of the voice coil; and
   based on the determination, adjust the one or more drive signals during one or more additional cycles of the actuator; and
   wherein, to determine whether the stroke of the component is substantially centered, the controller is configured to:
   identify a first time between a first extreme in the back EMF voltage and a second extreme in the back EMF voltage;
   identify a second time between the second extreme in the back EMF voltage and a third extreme in the back EMF voltage; and
   determine whether the first and second times are substantially equal.

8. The apparatus of Claim 7, wherein the controller is configured to:
   adjust the one or more drive signals for the voice coil to move a centering of the stroke of the component in a first direction when the first time is larger than the second time; and
   adjust the one or more drive signals for the voice coil to move the centering of the stroke of the component in a second direction when the second time is larger than the first time.

9. The apparatus of claim 8, wherein the controller is further configured to use a difference between the first and second times to identify a magnitude of an offset between the centering of the stroke of the component and a desired position.

10. The apparatus of claim 7, wherein:
the electromagnetic actuator comprises a motor; and
the component comprises a piston.

11. An apparatus comprising:
a controller configured to generate one or more drive signals for driving a component of an electromagnetic actuator back and forth during multiple cycles of the actuator;
wherein the controller is configured to:
identify an extreme of a back electromotive force (EMF) voltage of a voice coil in the actuator during each of at least some of the cycles;
determine whether a stroke of the component is substantially centered based on the extremes of the back EMF voltage of the voice coil; and
based on the determination, adjust the one or more drive signals during one or more additional cycles of the actuator;
wherein, to determine whether the stroke of the component is substantially centered, the controller is configured to determine whether the back EMF voltage of the voice coil is substantially maximized; and
wherein, to determine whether the back EMF voltage of the voice coil is substantially maximized, the controller is configured to:
identify the extremes of the back EMF voltage of the voice coil during different cycles of the actuator in which a centered position of the component's stroke is different; and
identify a largest extreme of the back EMF voltage.

12. The apparatus of claim 11, wherein the controller is configured to adjust the one or more drive signals for the voice coil to obtain the largest extreme of the back EMF voltage.

13. The apparatus of claim 11, wherein:
the electromagnetic actuator comprises a motor; and
the component comprises a piston.

14. A system comprising:
an electromagnetic actuator comprising a voice coil; and
a controller configured to:
generate one or more drive signals for driving a component of the actuator back and forth during multiple cycles of the actuator;
identify an extreme of a back electromotive force (EMF) voltage of the voice coil during each of at least some of the cycles;
determine whether a stroke of the component is substantially centered based on the extremes of the back EMF voltage of the voice coil; and
based on the determination, adjust the one or more drive signals during one or more additional cycles of the actuators;
wherein, to determine whether the stroke of the component is substantially centered, the controller is configured to:
identify the extremes of the back EMF voltage of the voice coil during different cycles of the actuator in which a centered position of the component's stroke is different;
identify a largest extreme of the back EMF voltage; and
adjust the one or more drive signals for the voice coil to substantially maximize the back EMF voltage.

15. The system of claim 14, wherein the controller is configured to adjust the one or more drive signals for the voice coil to obtain the largest extreme of the back EMF voltage.

16. The system of claim 14, wherein:
the electromagnetic actuator comprises a motor; and
the component comprises a piston.

17. A system comprising:
an electromagnetic actuator comprising a voice coil; and
a controller configured to:
generate one or more drive signals for driving a component of the actuator back and forth during multiple cycles of the actuator;
identify an extreme of a back electromotive force (EMF) voltage of the voice coil during each of at least some of the cycles;
determine whether a stroke of the component is substantially centered based on the extremes of the back EMF voltage of the voice coil; and
based on the determination, adjust the one or more drive signals during one or more additional cycles of the actuator;
wherein, to determine whether the stroke of the component is substantially centered, the controller is configured to:
identify a first time between a first extreme in the back EMF voltage and a second extreme in the back EMF voltage;
identify a second time between the second extreme in the back EMF voltage and a third extreme in the back EMF voltage; and
determine whether the first and second times are substantially equal.

18. The system of claim 17, wherein the controller is configured to:
adjust the one or more drive signals for the voice coil to move a centering of the stroke of the component in a first direction when the first time is larger than the second time; and
adjust the one or more drive signals for the voice coil to move the centering of the stroke of the component in a second direction when the second time is larger than the first time.

19. The system of claim 18, wherein the controller is further configured to use a difference between the first and second times to identify a magnitude of an offset between the centering of the stroke of the component and a desired position.

20. The system of claim 17, wherein:
the electromagnetic actuator comprises a motor; and
the component comprises a piston.

* * * * *